United States Patent
De Ross

[15] 3,676,391
[45] July 11, 1972

[54] COATING COMPOSITIONS FOR POLYOLEFIN SUBSTRATES

[72] Inventor: Frank De Ross, Zion, Ill.

[73] Assignee: The Dexter Corporation, Windsor Locks, Conn.

[22] Filed: April 3, 1970

[21] Appl. No.: 25,546

[52] U.S. Cl................260/33.6 UA, 117/76 F, 117/138.8 E, 117/161 UC, 260/33.8 UA, 260/897 C
[51] Int. Cl.........................................C08f 45/28, C08f 45/30
[58] Field of Search..................260/28.5, 33.6 U, 31.8, 31.6, 260/33.8 UA, 901, 897 C

[56] References Cited

UNITED STATES PATENTS

| | | | |
|---|---|---|---|
| 2,319,074 | 5/1943 | McGill | 260/897 C |
| 2,413,259 | 12/1946 | Soday | 260/901 |
| 2,640,817 | 6/1953 | Sheridan | 260/33.6 U |
| 3,291,862 | 12/1966 | Armour | 260/897 C |
| 3,121,067 | 2/1964 | Nelson | 260/28.5 |
| 3,492,279 | 1/1970 | Folzenlogen | 260/31.6 |
| 3,505,256 | 4/1970 | Duffy | 260/33.6 U |
| 3,513,119 | 5/1970 | Cannelongo | 260/28.5 |

Primary Examiner—Morris Liebman
Assistant Examiner—P. R. Michl
Attorney—Merriam, Marshall, Shapiro & Klose

[57] ABSTRACT

Coating composition for priming untreated polyolefin substrates is provided comprising a resin of chlorinated polyolefin and ethylene/vinyl acetate copolymer in a stable solvent system. Also composition for protective and decorative coatings for direct application to untreated polyolefin substrate, comprising a resin of chlorinated polyolefin and acrylic copolymers.

7 Claims, No Drawings

COATING COMPOSITIONS FOR POLYOLEFIN SUBSTRATES

This invention relates to synthetic resin compositions for costing untreated polyolefinic substrates and more specifically to primers and protective and decorative coatings for such substrates.

Because of the relatively non-porous macroscopic surface characteristics of many polyolefinic materials, and particularly polypropylene it has been necessary to treat the surface of objects made from or coated with such materials prior to the application of any coating compositions. The need for preliminary treatment is even greater in the case of protective or decorative finishing compositions.

It has been the practice in the prior art to alter the surface of such objects by etching with acid or oxidation with flame. Such procedures have proven to be hazardous, costly and time consuming. An alternate practice in the prior art has been to treat the surface with a primer composition. Such primer compositions have proven to be generally unsatisfactory for numerous reasons. Some of the primer compositions known in the art have exhibited good adherence characteristics with respect to either the polyolefinic substrate or the topcoat composition but not with respect to both. Other such compositions have exhibited a marked tendency to redissolve in the solvent of the topcoat composition, thereby exposing again portions of the substrate. Still other primer compositions have failed to provide primed surface with good wettability characteristics which would allow for the smooth and uniform application and drying of the topcoat composition.

The synthetic resin compositions of the present invention provide a coating material for untreated polyolefinic substrates which is free from the foregoing and other difficulties.

Compositions prepared according to the invention may be employed as finished coatings for direct application to the untreated surface of objects made from or coated with polyolefinic materials.

Further, compositions prepared according to the invention may serve as primers which exhibit good adherence characteristics with respect to both polyolefinic substrate and a protective and decorative topcoat composition.

Primer compositions prepared according to the invention after drying on the polyolefin substrates possesses a limited solubility range and are hence less likely to redissolve in the solvents of topcoat compositions. The primer compositions of the invention further possess good wettability characteristics with respect to topcoat compositions.

Other advantages of the use of compositions prepared according to the subject invention will become apparent to those skilled in the art upon further study of the description and appended claims.

In the practice of the invention, a composition, suitable for use as a primer for untreated polyolefin substrates, is prepared from a resin solution having as its principal components (1) from about 50 percent to about 85 percent by weight solids of a low molecular weight chlorinated polyolefin, said chlorinated polyolefin having from about 25 percent to 29 percent by weight chlorine; and (2) from about 15 percent to about 50 percent by weight solids of ethylene/vinyl acetate copolymer in a suitable solvent. It has been found that the use of less than about 15 percent by weight of the copolymer will cause problems wetting the substrate and the use of more than 50 percent by weight of the copolymer produces a primer which tends to be too soluble in the solvents for the topcoat. In such cases, the soluble primer mixes with the topcoat and the adhesion between the primer and the substrate is lost.

The present invention contemplates the use of chlorinated polyolefins which contain from about 25 percent to about 29 percent by weight chlorine and which have molecular weights from about 3,500 to about 12,000 after the chlorination. It is preferred to use chlorinated polypropylene in the practice of the present invention. Suitable chlorinated polypropylenes for the practice of the present invention include the materials sold under the tradename Chlorinated Polyolefin 343-1 and Chlorinated Polyolefin 515-2. These materials are low molecular weight polypropylenes which are chlorinated to yield polymers containing 25-29 percent by weight of chlorine and with molecular weights of 3,800 and 10,000 respectively.

The ethylene/vinyl acetate copolymer should contain at least 30 percent by weight of vinyl acetate and preferably more. Particularly good results, with respect to wetting the surface of the substrate, have been obtained using a copolymer sold under the tradename Elvax resin 40. This resin is a copolymer of ethylene and vinyl acetate containing about 40 percent by weight of vinyl acetate and having an inherent viscosity of 0.70 measured at 30° C (0.25g/100 ml toluene).

Appropriate solvents for the resin solution of the invention are aliphatic and aromatic hydrocarbons such as hexane, heptane, benzene, toluene, xylene, xylol, trichloroethylene, and V M & P Naphtha, which solvent will dissolve the resin but will not have detrimental effects on the polyolefin substrate.

Also present in primer compositions of the invention may be pigments such as carbon black, aluminum paste, soluble pigments and dyes; stabilizers such as propylene oxide; wetting agents depending as soya lecithin; and anti-setting agents. Further, other modifying resins such as chlorinated diphenyl may be added to enhance the adhesive properties and wettability characteristics of the compositions. The concentration of the resinous components in the composition may range between about 2.5 percent to about 25 percent by weight, depending upon the viscosity, solids and pigmentation desired or best suited for a specific method of application.

This composition, used as a primer, will accept with excellent results topcoating materials such as nitro cellulose lacquers, acrylic lacquers, thermo-setting acrylics, alkyd-amine enamels, air drying alkyd enamels, polyurethanes, aluminum reflective coating, chlorinated rubber coating, and modified epoxy, showing no tendency to re-dissolve in the solvents of such topcoats, and in all cases exhibiting good wettability characteristics.

Application of the composition to a polyolefin substrate may be by spraying, dipping, brushing, or other suitable means. Good coating results are obtained when the primer is applied at a film thickness of 0.1 to 0.2 mils. Topcoats may be applied to the primed substrate as soon as the primer solvents have evaporated, but extensive drying is not necessary. Thus, following application of the primer coating composition, the article may be topcoated within 1 minute or may be subjected to heated forced air drying at a temperature of about 150°–200° F. for about 5 minutes and then topcoated.

When compositions prepared according to the invention are to be employed as the sole protective coating or the finish coating for a polyolefin substrate, i.e., to be applied to an unprimed and otherwise unaltered polyolefinic surface, a combination of resins different from that used in the primer has been found to be more desirable. The active adhesion promoting ingredient in such compositions is, however, the chlorinated polyolefins of the type above described. Finish coating compositions of the invention are prepared from a resin solution having as its principal components (1) from about 3 percent to about 20 percent by weight solids of chlorinated polyolefins described above about 25 percent to about 29 percent by weight chlorine; and (2) from about 80 percent to about 97 percent by weight solids of a thermoplastic acrylic resin. The thermoplastic acrylic resins are preferably methacrylate copolymer such as those sold under the tradename Elvacite 6016, which is in the form of a 40 percent toluene solution of a copolymer of n-butyl methacrylate and methyl methacrylate (60/40), said copolymer having an inherent viscosity of 0.24–0.28 (0.25 g of contained polymer in 50 ml chloroform, at 25° C). Good results have been obtained using a copolymer of n-butyl methacrylate and isobutyl methacrylate (50/50) having an inherent viscosity of about 0.61, sold under the tradename Elvacite 2046.

While it is impossible to operate outside of the stated ranges, topcoat compositions which contain more than about 20 percent by weight of the chlorinated polyolefin tend to produce films which are relatively soft and unsuitable for many purposes and such compositions are also more expensive.

The present invention contemplates the use of one or more modifying resins to replace a portion of the thermoplastic acrylate ester. For instance as much as two-thirds of the thermoplastic acrylate can be replaced with a modifying resin such as chlorinated diphenyl, acrylated alkyds, natural resins, and petroleum based resins for various purposes.

The compositions of the present invention may be modified by the addition of pigments, plasticizers, wetting agents, mar-resistance improving additives, and other ingredients well known to those skilled in the art.

When used as a sole decorative coating, the compositions should be applied at a film thickness capable of achieving good coverage and opacity. Depending on color and pigment loadings, such results are obtained with film thicknesses ranging from 0.5 to 1.5 mils. The coating will normally dry on standing for about 20 minutes, or may be subjected to oven curing at temperatures between 150°–250° F. for 5 to 10 minutes.

Usually force drying will improve the adhesive characteristics of the coating. The following examples serve to illustrate the preparation of several coating compositions within the present invention, it is understood that these examples are set forth merely for illustrative purposes and many other coating compositions are within the scope of the present invention.

EXAMPLE I

A light gray colored finish coating composition suitable for one coat application by spraying was prepared according to the following formulation:

Light Gray Coating

| Component | Grams |
|---|---|
| Non-chalking TiO$_2$ | 130.0 |
| Carbon Black | 7.5 |
| Elvacite 6016 | 105.0 |
| Xylol | 67.0 |
| 50% Soya Lecithin in xylol solution | 2.5 |

The above components were ground in pebble mill apparatus for about 48 hours until a 6½ Hegman scale grind was achieved. To this grind the following was added:

| | |
|---|---|
| Elvacite 6016 | 295 |
| Xylol | 200 |
| Micronized talc | 80 |
| Butyl benzyl phthalate | 20 |
| Chlorinated polyolefin 515-2 (40% NVM xylol solution) | 17 |
| Total | 924 |

The product thus obtained had the following physical properties:

| | |
|---|---|
| Weight per gallon | 9.45 lbs. |
| Viscosity | 28 seconds (No. 4 Ford cups) |
| Gloss | 5–20 on 60° Gardner gloss meter |
| Wt. NVM | 44% |

A 4:1 dilution of the product with toluene provided a composition suitable for spraying.

Untreated polypropylene plaques were sprayed with the composition to a film thickness of 1 mil and dried at 200° F. for 10 minutes. The composition exhibited exceptional adhesion to the polyolefin substrate as evidenced by pressure sensitive tape stripping test results on cross hatched sections of the film.

EXAMPLE II

A silver metallic protective and decorative finish coating compositions suitable for application by spraying was prepared according to the following formulation:

Silver Metallic Coating

| Component | Grams |
|---|---|
| Non-leafing Aluminum Paste (Alcoa No. 222) | 52 |
| Toluol | 30 |

The above were combined slowly with mixing until a uniform slurry was obtained.

| | |
|---|---|
| Elvacite 6016 | 516 |
| Xylol | 123 |
| Ethyl acetate | 30 |
| Butyl benzyl phthalate | 20 |
| Silicone fluid leveling agent (e.g., Dow Corning Corp., No. 11 Additive) | 3 |
| Chlorinated Polyolefin 515-2 (40% NVM xylol solution) | 26 |
| Total | 800 |

The product thus prepared had the following physical constants:

| | |
|---|---|
| Weight per gallon | 8.04 lbs. |
| Viscosity | 25 seconds (No. 4 Ford Cups) |
| Gloss | 50 on 60° Gardner Gloss meter |
| Weight NVM | 32.5% |

This composition, diluted 4–1 with toluol, was sprayed on untreated polypropylene plaques to a film thickness of 0.75–1 mils and cured 10 minutes at 200° F.

The pressure sensitive tape stripping test revealed excellent adhesion of the coating to the substrate.

EXAMPLE III

A green metallic protective and decorative finish coating composition suitable for application by spraying was prepared according to the following formulation:

GREEN METALLIC COATING

Coloring mixture, flatting paste and mar-proofing agent ingredients prepared as follows:

A. Coloring Mixture

| Component | Grams |
|---|---|
| Carbon Black | 2 |
| Phthalocyanine green | 5 |
| Xylol | 21 |
| Elvacite 6016 | 32 |
| 50% Soya Lecithin in xylol solution | 1 |
| Total | 61 |

The above components were ground in the pebble mill for 48 hours until a 6½ Hegman scale grind was achieved.

B. Flatting Paste

| Component | Grams |
|---|---|
| Silica aerogel (e.g., Syloid 162) | 12.0 |
| Elvacite 6016 | 18.0 |
| Xylol | 28.5 |
| 50% Soya Lecithin in xylol solution | 0.5 |
| Total | 59.0 |

The above components were ground in a pebble mill for 6 hours until a 6 Hegman scale grind was achieved.

C. Mar-Proofing Agent

| Component | Grams |
|---|---|
| Instant Texalon (Lawter Chemical Co., polyolefin-wax product) | 9 |
| Xylol | 38 |
| Butyl acetate | 12 |
| Total | 59 |

The above components were ground in a pebble mill for 24 hours.

The final product was assembled as follows:

| Component | Grams |
|---|---|
| Non-leafing Aluminum Paste (Alcoa 222) | 52.0 |
| Toluol | 30.0 |

The above components were combined slowly with mixing until a uniform slurry was obtained.

| | | |
|---|---|---|
| | Coloring mixture (Ingredient A) | 61.0 |
| | Flatting paste (Ingredient B) | 59.0 |
| | Mar-proofing agent (Ingredient C) | 59.0 |
| | Elvacite 6016 | 516.0 |
| | Ethyl acetate | 30.0 |
| | Chlorinated Polyolefin 515-2 (40% NVM xylol solution) | 26.5 |
| Total | | 906.5 |

The product thus prepared had the following physical properties:

| | |
|---|---|
| Weight per gallon | 8.5 lbs. |
| Viscosity | 22 seconds (No. 4 Ford cups) |
| Gloss | 11 on 60° Gardner Gloss meter |
| Weight NVM | 35% |

This composition, diluted 4-1 with toluene, was sprayed on untreated polypropylene plaques to a film thickness of 0.7 to 1 mil and cured 10 minutes at 200° F.

The pressure sensitive tape stripping test revealed excellent adhesion of the coating to the substrate.

EXAMPLE IV

A primer coating composition was prepared according to the following formulation:

Black Primer

| Component | Grams |
|---|---|
| Chlorinated Polyolefin 343-1 (25% NVM xylol solution) | 15.0 |
| Elvax 40 | 3.5 |
| Toluol | 14.5 |
| Xylol | 100.0 |
| 50% Xoya Lecithin in xylol solution | 1.0 |
| Carbon Black | 16.5 |
| Propylene oxide | 0.5 |

The above components were ground in a pebble mill for about 48 hours until a 7 Hegman scale grind was obtained.

| | | |
|---|---|---|
| | Chlorinated Polyolefin 343-1 (25% NVM xylol solution) | 66.0 |
| | Xylol | 222.0 |
| | V M & P Naphtha | 166.0 |
| | Lactol spirits | 166.0 |
| | Propylene oxide | 1.5 |
| Total | | 772.5 |

The product thus obtained had the following physical properties:

| | |
|---|---|
| Weight per gallon | 6.84 lbs. |
| Viscosity | 15 seconds at Zahn (No. 2 cup |
| Weight Solids | 5.2% |
| Gloss | flat |

This composition may be applied without further dilution to untreated polyolefin substrates by any of the conventional coating methods used in the industry, such as spraying, dipping, flow coating etc. The surface so primed may be topcoated within one to 5 minutes, or as soon as the solvents have evaporated. It also may be oven dried at temperatures up to 250° F. for 5-20 minutes without affecting the performance of the coating. Excellent adhesion between the primer and the following class of topcoats was noted: Acrylic lacquers, thermosetting acrylics, nitrocellulose lacquers, alkyd-amine enamels, polyurethanes, high reflective aluminum coatings, air drying alkyd enamels and chlorinated rubber, adhesion being checked with pressure sensitive tape stripping test run on cross hatched section of the film.

The coating compositions described herein may be used to coat many different types of substrates. Although the results obtained in coating polyethylene leave much to be desired, outstanding results have been obtained in coating untreated polypropylene and polybutylene.

It will be obvious to those skilled in the art that many modifications and variations of the above-described invention may be made without departing from the spirit and scope thereof.

What is claimed is:

1. A finish coating composition which exhibits good adherence characteristics when applied directly to a polypropylene substrate, said composition comprising a solution of a resin mixture, said resin mixture containing from about 3 percent to about 20 percent by weight of a low molecular weight chlorinated polypropylene, containing from about 25 percent to about 29 percent by weight for chlorine, having a molecular weight between about 3,500 and 12,000, and from about 80 percent to about 97 percent by weight of a methyl/butyl methacrylate copolymer and an organic solvent for said resin mixture.

2. A coating composition as set forth in claim 1, wherein said copolymer is a copolymer of methyl methacrylate and n-butyl methacrylate.

3. A coating composition as set forth in claim 2, wherein said copolymer is a 40/60 methyl/n-butyl copolymer.

4. A coating composition as set forth in claim 1 wherein up to about two-thirds of said copolymer is replaced by a modifying resin selected from the group consisting of chlorinated diphenyl, acrylated alkyds, natural resins and petroleum based resins.

5. A coating composition as set forth in claim 1 wherein up to about two-thirds of said copolymer is replaced with chlorinated diphenyl.

6. A coating composition as set forth in claim 1 wherein said solvent for said resin solution comprises one or more aliphatic and aromatic hydrocarbons selected from the group consisting of hexane, heptane, trichloroethylene benzene, toluene, xylene, xylol and naphtha.

7. A coating composition as set forth in claim 1 which comprises pigments.

* * * * *

PO-1050
(5/69)

UNITED STATES PATENT OFFICE
CERTIFICATE OF CORRECTION

Patent No. 3,676,391              Dated July 11, 1972

Inventor(s) FRANK DE ROSSI

It is certified that error appears in the above-identified patent and that said Letters Patent are hereby corrected as shown below:

First printed page, "Ross" should be --Rossi--

Col. 1, line 5, "costing" should be --coating-- line 40, after "both" add --a--

Col. 2, line 21, delete "depending" and add --such-- line 46, "200" is divided on two lines line 73, "impossible" should be --possible--

Col. 4, line 74, "59" should be placed under "12"

Col. 6, line 5, delete "("

line 38, "for" should be --of--

Signed and sealed this 2nd day of January 1973.

(SEAL)
Attest:

EDWARD M. FLETCHER, JR.          ROBERT GOTTSCHALK
Attesting Officer                Commissioner of Patents